United States Patent
Yamazaki et al.

(10) Patent No.: US 7,929,383 B2
(45) Date of Patent: Apr. 19, 2011

(54) NOTEBOOK OPTICAL DISC DRIVE CAPABLE OF GENERATING A PSEUDO EJECT SIGNAL

(75) Inventors: Mitsuhiro Yamazaki, Yokohama (JP); Yasumichi Tsukamoto, Yamato (JP); Toshiki Takahashi, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 80 days.

(21) Appl. No.: 12/356,583

(22) Filed: Jan. 21, 2009

(65) Prior Publication Data
US 2009/0199222 A1 Aug. 6, 2009

(30) Foreign Application Priority Data
Feb. 5, 2008 (JP) ................................. 2008-024814

(51) Int. Cl.
G11B 21/08 (2006.01)

(52) U.S. Cl. .................. 369/30.27; 369/30.32; 720/601; 713/323

(58) Field of Classification Search ............... 369/30.27, 369/53.2, 53.41, 30.32, 30.06; 720/601, 720/602, 617, 619–627; 713/300, 310, 320–324, 713/330, 340; 710/14
See application file for complete search history.

(56) References Cited

U.S. PATENT DOCUMENTS

| | | | | |
|---|---|---|---|---|
| 6,226,237 | B1 * | 5/2001 | Chan et al. ...................... | 710/14 |
| 7,684,288 | B2 * | 3/2010 | Kaneko et al. .............. | 369/30.32 |
| 2006/0200693 | A1 * | 9/2006 | Uehara .......................... | 713/320 |
| 2007/0025195 | A1 * | 2/2007 | Oh et al. ..................... | 369/30.03 |
| 2008/0301721 | A1 * | 12/2008 | Kaneko et al. ................ | 720/601 |

FOREIGN PATENT DOCUMENTS

| | | |
|---|---|---|
| JP | 07-154234 | 6/1995 |
| JP | 11-149689 | 6/1999 |
| JP | 2004-185780 | 7/2004 |
| JP | 2004185780 A * | 7/2004 |
| JP | 2005-222679 | 8/2005 |

* cited by examiner

Primary Examiner — Tan X Dinh
(74) Attorney, Agent, or Firm — Antony P. Ng; Dillon & Yudell LLP

(57) ABSTRACT

A optical disc drive is disclosed. The optical disc drive includes a housing and a tray configured to accommodate a disc therein. The optical disc drive also includes an automatic return-type eject switch, a drive controller, and an eject controller. Mounted in the housing, the automatic return-type eject switch is configured to generate an eject signal. In response to the eject signal, the drive controller ejects the tray. In response to the eject signal, the eject controller supplies an electric power to the optical disc drive, and transmits a pseudo eject signal to the drive controller to eject the tray by way of a line through which the eject signal has been transferred after a predetermined time period from the supply of the electric power has lapsed.

12 Claims, 5 Drawing Sheets

NOTEBOOK OPTICAL DISC DRIVE CAPABLE OF GENERATING A PSEUDO EJECT SIGNAL

PRIORITY CLAIM

The present application claims benefit of priority under 35 U.S.C. §§120, 365 to the previously filed Japanese Patent Application No. JP2008-024814 entitled, "Tray ejecting system of optical disc drive and computer" with a priority date of Feb. 5, 2008, which is incorporated by reference herein.

BACKGROUND OF THE INVENTION

1. Technical Field

The present invention relates to optical disc drives in general, and in particular to a method for achieving power savings on an optical disc drive.

2. Description of Related Art

A notebook personal computer (note PC) commonly includes an optical disc drive (ODD). A disc recording medium can be loaded into and unloaded from an ODD. Since the ODD of a note PC is typically used only for reading/writing data from/to a disc recording medium and is not used for other purposes, the period when the ODD is actually operating is extremely short compared with the usage time of the entire note PC. Thus, if electric power is supplied to the ODD even when it is not being used, electric power of approximately 200 mW to 400 mW is unnecessarily consumed internally.

For a note PC, an ODD is usually integrated into a device bay of the note PC by a computer maker. In a tray-loading type ODD, a disc recording medium can be mounted on a tray to be used. An eject switch is mounted in a surface of a housing of the ODD so that when the eject switch is pressed by a user, an eject signal is produced and a tray is slide outward from the housing of the ODD by an electrical driving mechanism such as a motor or a solenoid. When the user momentarily pushes the tray, the tray is drawn inward via the electrical driving mechanism.

An ODD is supplied with an electric power from a power supply circuit of a note PC. The power supply to the ODD may be stopped if it is not expected to be used. In order to use the ODD to which the power supply is stopped by loading a disc recording medium thereto, it is necessary to eject the tray. However, since the tray is electrically operated, it is necessary to pre-apply an electric power to the ODD. It may be possible to eject the tray by a user operating an eject switch after an electric power is supplied to the ODD via a power supply switch or a software program. However, since the provision of a power supply switch may lead to cost increase and may impose an extra operation on the user, the addition of the power supply switch is not very desirable.

For a design in which a power supply to the ODD is maintained, when the user momentarily presses the eject switch, the ODD recognizes the eject signal and the tray is ejected immediately. Since the user recognizes the timely reaction of the tray with respect to the eject button operation as such, it is desirable that the ejection of the tray in the ODD in which the power supply thereto is stopped is carried out in the same manner as the operation of the eject switch only case. In order to solve such a problem, the eject switch may also be functioned as a switch for supplying an electric power to the ODD. However, the ODD may not recognize the eject signal when the power supply is not input thereto, and at a time when the power supply is input to the ODD, the eject switch may return to its original state so that the eject signal disappears. Therefore, in order to eject the tray, the user may need to press again the eject switch after it is confirmed that the power supply is input to the ODD. In other words, the user needs to perform different operations than those made to an ODD in which the power supply thereto is maintained.

SUMMARY OF THE INVENTION

In accordance with a preferred embodiment of the present invention, an optical disc drive includes a housing and a tray configured to accommodate a disc therein. The optical disc drive also includes an automatic return-type eject switch, a drive controller, and an eject controller. Mounted in the housing, the automatic return-type eject switch is configured to generate an eject signal. In response to the eject signal, the drive controller ejects the tray. In response to the eject signal, the eject controller supplies an electric power to the optical disc drive, and transmits a pseudo eject signal to the drive controller to eject the tray by way of a line through which the eject signal has been transferred after a predetermined time period from the supply of the electric power has lapsed.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
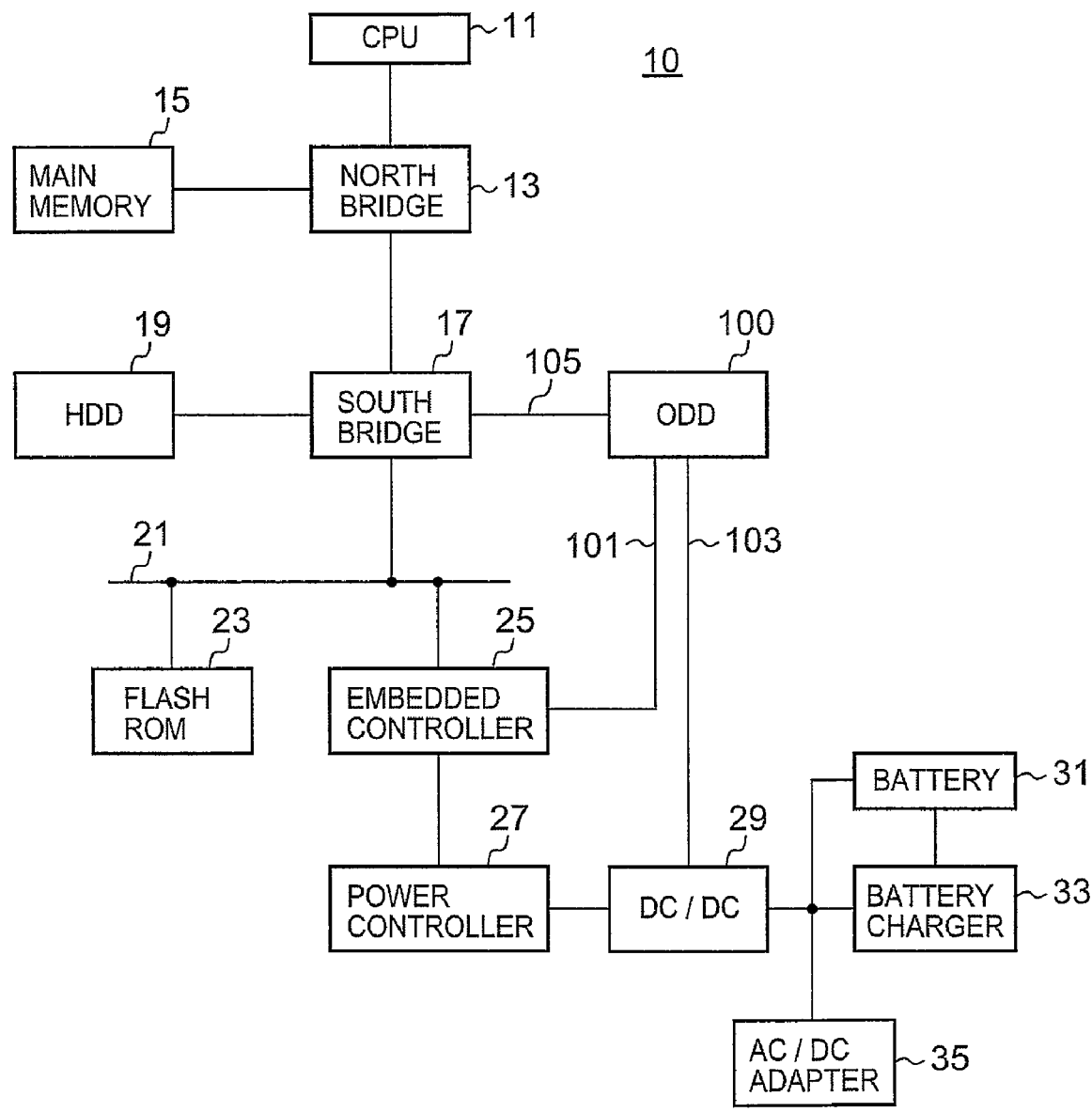
FIG. 1 is a block diagram of a note PC.

Referring now to the drawings and in particular to FIG. 1, there is depicted a block diagram of a note PC 10. A CPU 11 is an arithmetic processing device performing the central function of the note PC 10 and executes an operating system (OS), a BIOS, a device driver, or application programs. The CPU 11 controls a north bridge 13 and devices connected to the north bridge 13 via various buses. The north bridge 13 has a memory controller function for controlling an operation of accessing a main memory 15, a data buffer function for absorbing a difference in a data transfer rate between the CPU 11 and other device.

The main memory 15 is a random access memory used as a read area of programs executed by the CPU 11 and as a work area to which processed data are written. A south bridge 17 is connected to the north bridge 13, a hard disc device (HDD) 19, and an optical disc drive (ODD) 100. The south bridge 17 has integrated therewith an IDE controller serving as an interface of the HDD 19 and a serial ATA controller serving as an interface of the ODD 100. In the HDD 19, programs such as an OS, a device driver or an application program are stored. The ODD 100 is provided with a serial ATA interface.

The south bridge 17 is also connected via a PCI bus or an LPC bus 21 to legacy devices which have been used in the note PC 10 from the past or devices not requiring high-speed data transmission. The LPC bus 21 is connected to an embedded controller (EC) 25 and a flash ROM 23 storing a BIOS. The EC 25 is a microcomputer configured by an 8 to 16 bit CPU, a ROM, a RAM, and the like, and is further provided with an multi-channel A/D input terminal, a multi-channel D/A output terminal, a timer, and a digital input/output terminal. The EC 25 is capable of executing a program for managing an internal operating environment of the note PC 10 independently of the CPU 11.

A power controller 27 is connected to the EC 25 and a DC-DC converter 29 and is capable of controlling the DC-DC converter 29 based on an instruction from the EC 25. The DC-DC converter 29 converts a DC voltage supplied from an AC/DC adapter 35 or a battery 31 to a plurality of voltages necessary for operating the note PC 10 and then supplies electric power to respective devices based on electric power supply categories defined in accordance with a power supply mode. When the AC/DC adapter 35 is connected to the note PC 10, it supplies electric power to the DC-DC converter 29 and a battery charger 33 charging the battery 31.

The note PC 10 is compatible with an ACPI type power saving function and a plug-and-play function. The EC 25 controls the DC-DC converter 29 with intervention of the power controller 27, selects devices to be operated based on respective power supply states such as a soft-off state, a suspend state, a hibernation state, or a ON state, as defined by the power supply mode of the note PC 10, and supply electric power to the selected devices. Furthermore, upon receiving an instruction from the ODD 100, the EC 25 controls an field-effect transistor (FET) 153 (illustrated in FIG. 2) to thereby stop or start a power supply to the ODD 100.

The flash ROM 23 is a non-volatile memory, in which the stored contents are electrically rewritable, and stores therein a system BIOS, which is a basic program used for activation and management of a system; various utilities, which are software programs for managing power supply, temperature of a casing, and the like, a Power-On Self Test (POST), which is a software program for testing or initializing hardware components when the note PC 10 is activated. With respect to the ODD 100, FIG. 1 illustrates a line 105 connecting it to the south bridge 17, a line 101 connecting it to the EC 25, and a line 103 connecting it to the DC-DC converter 29, and the functions of these lines will be described in details in FIG. 2.

Figure 2:
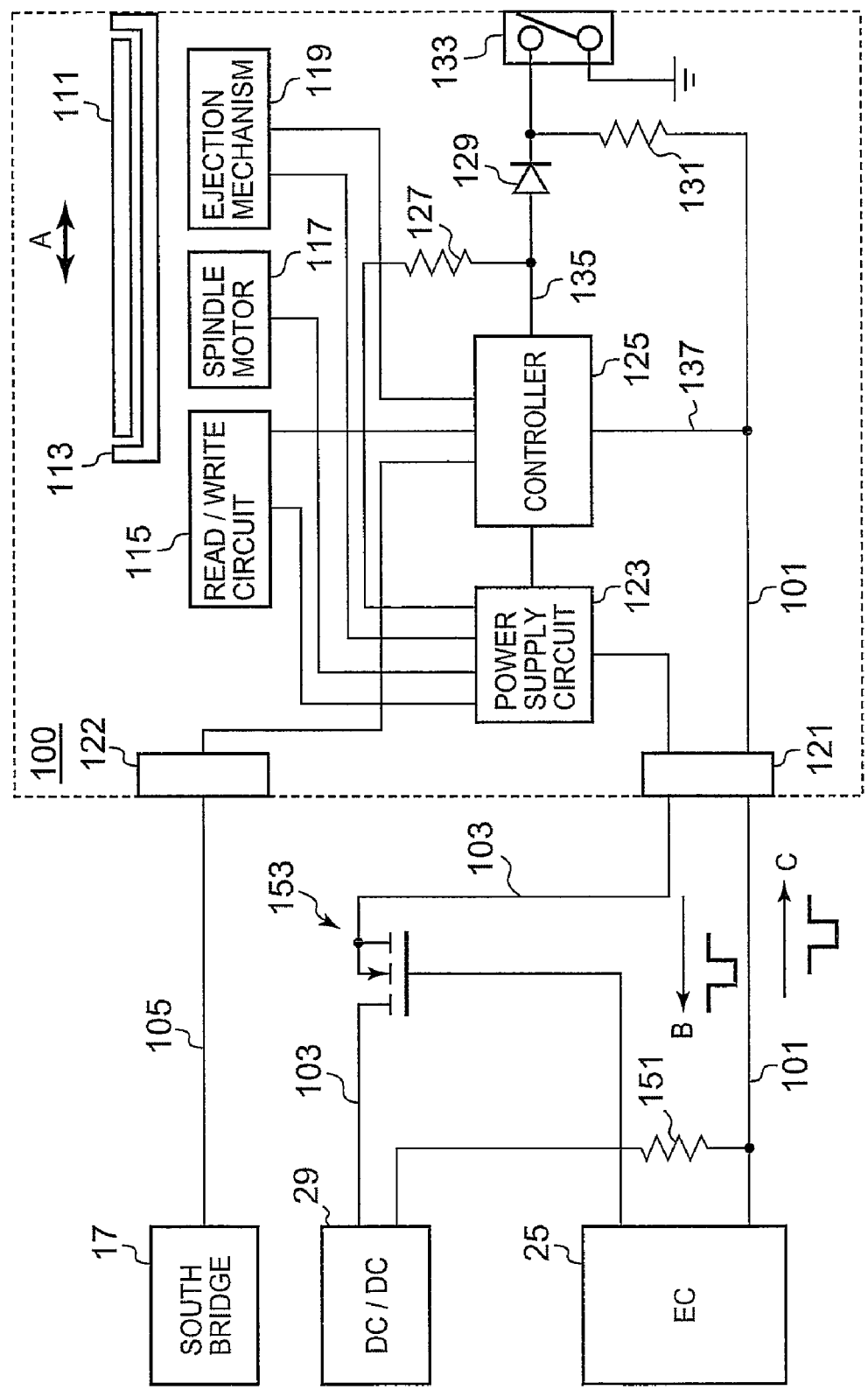
FIG. 2 is a block diagram of the ODD within the note PC from FIG. 1.

FIG. 2 is a block diagram for explaining a tray ejecting system of the ODD 100. The ODD 100 is provided with a serial ATA interface and is connected to another device of the note PC 10 by means of a signal terminal 122 and a power supply terminal 121. The signal terminal 122 is connected to the south bridge 17 through a line 105.

The signal terminal 122 is configured by seven pins in total including a pair of signal terminals (A+, A−) for transmitting signals from the south bridge 17 to the ODD 100, a pair of signal terminals (B+, B−) for transmitting signals from the ODD 100 to the south bridge 17, and three ground terminals (GND). The power supply terminal 121 is configured by six pins in total, which includes a Device Present (DP) pin, two power supply terminals (+5 V), a Manufacturing Diagnostic (MD) pin, and two ground terminals (GND). The MD pin is used for a manufacturing maker of an ODD to conduct a test in the course of its manufacturing process, and it is generally not used by the user after shipping thereof.

The power supply terminal 121 is connected to a source of an N-type FET 153 through a line 103. The FET 153 has its drain connected to the DC-DC converter 29 and its gate connected to the EC 25. Moreover, the MD pin of the power supply terminal 121 is connected to the EC 25 through a shared line 101. The shared line 101 is maintained at a predetermined potential through a pull-up resistor 151 even when the power supply to the ODD 100 is stopped.

The ODD 100 is a tray-loading type optical disc drive and is provided with a tray 113 capable of removably accommodating a disc 111. An ejection mechanism 119 is provided with a motor driving mechanism capable of ejecting/accommodating the tray 113 from/in a housing of the ODD 100 as indicated by the arrow A. A spindle motor 117 is configured to rotate the disc 111 in response to a read or write command from the CPU 11 when the tray 113 accommodating the disc 111 is accommodated in the housing of the ODD 100.

A read/write circuit 115 includes a laser emitting portion, an optical mechanism, a focusing mechanism, a tracking mechanism, and a data/signal processing circuit. The read/write circuit 115 is also provided with a disc detection circuit configured to detect whether or not the disc 111 is accommodated in the tray 113, so that when the disc 111 is not loaded, the read/write circuit 115 transmits a signal indicating an un-mounted disc to the CPU 11 through a controller 125 and the line 105. A power supply circuit 123 supplies an electric power received from the DC-DC converter 29 to respective devices of the ODD 100. The controller 125 is provided with a serial ATA interface circuit for performing data transmission with the CPU 11 with intervention of the south bridge 17, and a control circuit, a processor, a firmware, a memory, and the like for controlling internal devices of the ODD 100.

An eject terminal of the controller 125 is connected to a line 135. The line 135 is maintained at a predetermined potential by being connected to the power supply circuit 123 through a pull-up resistor 127. The eject terminal is connected to an anode of a diode 129 through the line 135, and a cathode of the diode 129 is connected to one terminal of an eject switch 133. The eject switch 133 is mounted in the housing of the ODD 100 and has the other terminal thereof connected to the ground. When a user presses the eject switch 133, the line 135 is pulled to a low state so that an eject signal is supplied to the eject terminal of the controller 125.

Upon recognizing the eject signal when an electric power is supplied to the ODD 100, the controller 125 controls the ejection mechanism 119 so as to eject the tray 113 out of the housing of the ODD 100. The eject switch 133 is a type of switch configured to perform a momentary action (or automatic return action) where the circuit is closed only when it is pressed by a user's hand and is opened when the pressing force is removed. In contrast, there exists a switch configured to perform an alternate action where the closed-circuit state is continuously maintained even when the pressing force is removed while returning to its original state when it is pressed once more. However, the ODD 100 has a characteristic that it cannot recognize the eject signal when an electric power is supplied in a state where the eject signal is supplied thereto (the low state of the line 135), so that such an alternate type switch cannot be used in such ODD.

This is because ODD manufacturing makers have configured the recent ODDs to not receive an eject signal unless initialization is completed, and it is considered to be based on the following reasons. As a first reason, it is considered that even when it is recognized that the eject terminal has already been in the low state in a state where the controller 125 is able to monitor an internal state of the ODD 100, since there is a possibility that a path of the eject signal, which is to be normally in the high state, is shorted to the ground or the eject switch 133 is in the pressed state in response to an unintended external condition, it is determined that any failure has occurred. Moreover, it is considered that only an eject signal produced after the eject switch 133 is opened and it is confirmed that the ejection circuit is normally operating is recognized as a proper eject signal.

As another reason, it is considered that there may be a case where the controller 125 recognizes a falling edge of a pulse signal transitioning from a high state to a low state as an eject signal, rather than simply recognizing the eject signal from a fact that the eject terminal is in the low state. Since an operation of the eject switch 133 performed by the user is usually a momentary press-and-release operation, a signal produced at that moment corresponds to an one-shot pulse signal, so that it can be said that detecting the falling edge is similar to detecting a normal ejection operation performed by the user. A cathode of the diode 129 is connected to the shared line 101 through a resistor 131. The controller 125 is provided with a Manufacturing Diagnostic (MD) terminal, and the MD terminal is connected to the shared line 101 through a line 137.

The shared line 101 is maintained at the potential of the pull-up resistor 151, so that even when an electric power is not supplied to the ODD 100, a low-active eject signal can be supplied to the EC 25 by pressing the eject switch 133. In the present embodiment, it is configured such that upon receipt of the eject signal, the EC 25 transmits a pseudo eject signal to the shared line 101 after a lapse of a predetermined time period.

Figure 3:
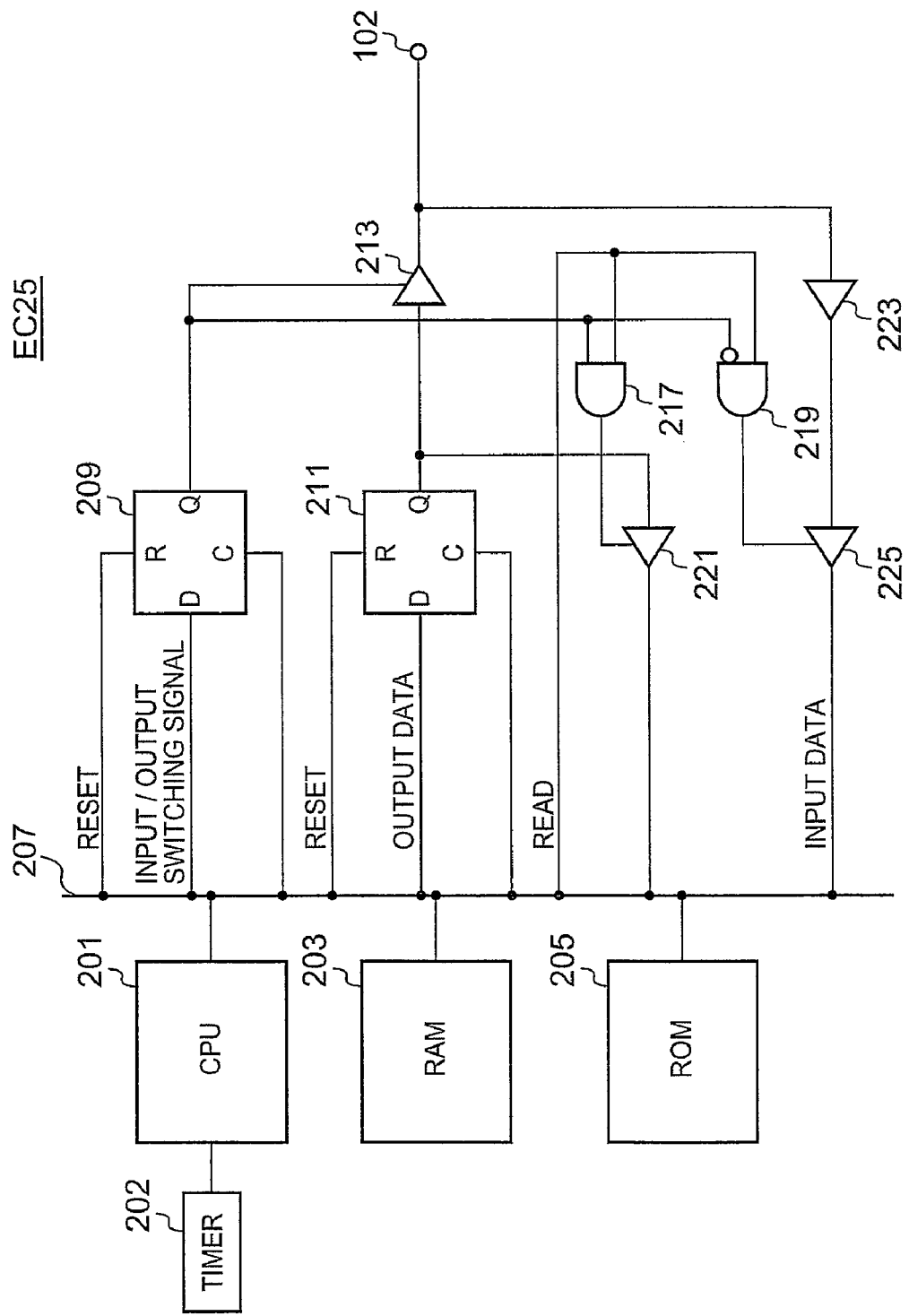
FIG. 3 is a block diagram of a module for inputting an eject signal and outputting a pseudo eject signal.

FIG. 3 is a block diagram of a module for allowing the EC 25 to input an eject signal and output a pseudo eject signal through the shared line 101. In the present embodiment, the eject signal produced by the eject switch 133 and the pseudo eject signal produced by the EC 25 are transmitted through the line 101. The EC 25 has a CPU 201, a RAM 203, and a ROM 205, which are connected to a bus 207. The CPU 201 is connected to a timer 202. Moreover, a firmware executed by the CPU 201 is stored in the ROM 205. A input/output terminal 102 is connected to the line 101.

A D flip-flop (D-FF) 209 has its input terminal D, reset terminal R, and clock terminal C being connected to the bus 207 while having its output terminal Q being connected to a control terminal of a three-state buffer 213, one terminal of an AND gate 217, and one terminal (negative logic) of an AND gate 219. The D-FF 209 is a device capable of determining whether the input/output terminal 102 will become an input terminal of the EC 25 or an output terminal thereof. A D-FF 211 has its input terminal D, reset terminal R, and clock terminal C being connected to the bus 207 while having its output terminal Q being connected to an input terminal of the three-state buffer 213 and an input terminal of a three-state buffer 221.

An output terminal of the three-state buffer 213 is connected to the input/output terminal 102. The output terminal of the three-state buffer 213 is also connected to an input terminal of an input buffer 223. An output terminal of the input buffer 223 is connected to an input terminal of a tri-state buffer 225, and an output terminal of the tri-state buffer 225 is connected to the bus 207. The other input terminals of the AND gates 217 and 219 are connected to the bus 207. An output terminal of the AND gate 217 is connected to a control terminal of the tri-state buffer 221, and an output terminal of the tri-state buffer 221 is connected to the bus 207. An output terminal of the AND gate 219 is connected to a control terminal of the tri-state buffer 225.

Next, a description of the operations of the EC 25 will be provided with reference to FIG. 3. When the EC 25 operates so that the input/output terminal 102 becomes the input terminal, an eject signal is received thereto from the ODD 100 through the line 101. When the EC 25 operates so that the input/output terminal 102 becomes the output terminal, a pseudo eject signal is transmitted therefrom to the ODD 100 through the line 101. The operations when the input/output terminal 102 serves as the input terminal are as follows. The CPU 201 puts the input terminal D of the D-FF 209 into a low state so that when a clock signal is input to the clock terminal C, the output terminal Q is pulled into a low state. As a result, the output terminal of the three-state buffer 213 is put into a high impedance state, and thus, signals from the D-FF 211 are not output to the input/output terminal 102.

When the CPU 201 transmits a high signal to the read line, the AND gate 219 is operated to thereby put the three-state buffer 225 into an ON state. The line 101 is always maintained at the predetermined potential by the pull-up resistor 151, so that when the line 101 is put into the low state, the input buffer 223 detects a signal and transmits the signal to the CPU 201 through the three-state buffer 225. The operations when the input/output terminal 102 serves as the output terminal are as follows. The CPU 201 puts the input terminal D of the D-FF 209 into a high state so that when a clock signal is input to the clock terminal C, the output terminal Q is pulled into a high state. As a result, the output terminal of the three-state buffer 213 logically becomes identical with the states of the input terminal thereof.

The CPU 201 sets data transmitted from the input/output terminal 102 as a high or low signal to the input terminal D of the D-FF 211 to thereby transmit a clock signal to the clock terminal C so that data can be transmitted from the output terminal Q. The data is transmitted from the input/output terminal 102 to the line 101 via the tri-state buffer 213. The output terminal Q of the D-FF 209 is in the high state, so that the AND gate 219 is not operated and the output terminal of the tri-state buffer 225 is maintained in a high impedance state. When the CPU 201 transmits a high signal to the read line, the AND gate 217 is operated so that the output terminal of the three-state buffer 221 becomes logically identical with the states of the input terminal. Therefore, the CPU 201 is able to read data transmitted by the D-FF 211 from the input/output terminal 102.

Figure 4:
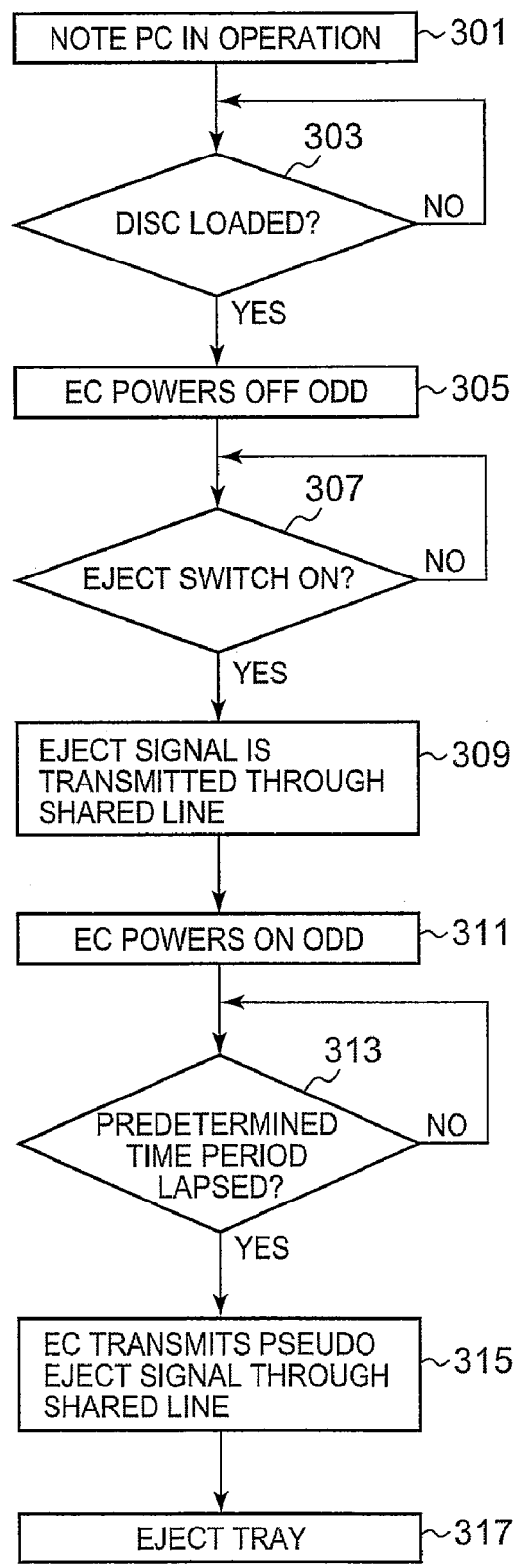
FIG. 4 is a flow chart illustrating operations when ejecting a tray of an ODD which is powered off.

FIG. 4 is a flow chart illustrating operations when ejecting the tray 113 of the ODD 100 which is powered off. At block 301, the note PC 10 is powered on and is in operation. When a power supply is input to the note PC 10 in a state where the ODD 100 is installed therein, or when an ODD is installed in the note PC 10 under operation and a power supply is input to the ODD, the ODD 100 receives a reset signal from the note PC 10. Then, an internal ROM of the controller 125 is checked, hardware components such as a timer or an interrupter are initialized, and initialization or the like of a RAM region regarding various program parameters is performed so that normal operations can be performed. Such processes performed internally by the ODD 100 until it becomes able to handle commands from the note PC 10 after an electric power is supplied to the ODD 100 are referred as ODD initialization. As an example, the time required for the initialization of the ODD 100 is about 600 to 800 ms.

When the initialization of the ODD 100 is completed, the note PC 10 performs allocation of resources to the ODD 100 and integration of device drivers by means of a plug-and-play function to thereby recognize the ODD 100 as a system. At block 303, the read/write circuit 115 determines whether or not the disc 111 is mounted on the tray 113. If the disc 111 is not mounted, the ODD 100 waits in a state of holding the electric power from the DC-DC converter 29 until it receives a command from the CPU 11. If the read/write circuit 115 determines, at block 303, that the disc 111 is mounted on the tray 113, the controller 125 transmits a power stop signal for stopping a power supply to the ODD 100, to the EC 25 by way of the line 105.

Upon receipt of the power stop signal, the EC 25 stops, at block 305, the power supply to the ODD 100 by controlling the FET 153. As a result, it is possible to prevent unnecessary electric power consumption by the ODD 100 which is not likely to be used because the disc 111 is not loaded thereto. At block 307, the process waits until the user operates the eject switch 133 in order to use the ODD 100. When the eject switch 133 is pressed at block 307, the line 135 is put into the low state so that an eject signal is supplied to the eject terminal of the controller 125. However, since an electric power is not supplied to the controller 125, the controller 125 does not perform any action in response to the eject signal.

The eject signal is an one-shot pulse signal which is usually produced when the user operates the automatic return-type eject switch 133. The eject signal is transmitted to the input/output terminal 102 of the EC 25 through the shared line 101 at block 309 (see the arrow B in FIG. 2). When the power supply to the ODD 100 is stopped, the EC 25 controls the D-FF 209 so that the input/output terminal 102 operates as the input terminal. The MD pin of the power supply terminal 121 is designed to be used by an ODD maker at the time of manufacturing and thus can be freely used by the user after shipping, so that even when the input/output terminal 102 is configured as the input terminal, it is possible to prevent unnecessary signals from being transmitted and thus causing operation problems.

Upon receipt of the eject signal through the input buffer 223, the CPU 201 executes the firmware stored in the ROM 205 to thereby put the FET 153 into an ON state so that a power supply is input to the ODD 100 at block 311. Moreover, the EC 25 notifies the OS that the ODD 100 has been installed and an electric power has been supplied thereto. Then, the OS starts recognition or various settings for allowing the ODD 100 to be used by the note PC.

At block 313, the EC 25 waits until the initialization of the ODD 100 to which the electric power has been supplied is completed. The timer 202 measures a period of time lapsed after the EC 25 has supplied the electric power to the ODD 100. Based on the time-up of the timer 202, the EC 25 controls, at block 315, the D-FF 209 so that the input/output terminal 102 becomes the output terminal at a time where a margin corresponding to an expected initialization time of about 600 to 800 ms is taken into consideration and further controls the D-FF 211 so that a pseudo eject signal being the one-shot pulse signal is transmitted to the shared line 101 (see the arrow C in FIG. 2).

Although the pseudo eject signal is transmitted to the MD terminal of the controller 125, since the MD terminal is designed to not receive an external signal in a state where it is not used by the user, the controller 125 ignores the pseudo eject signal. The pseudo eject signal is produced with a pulse width having a margin with respect to a pulse width of the eject signal recognized by the controller 125. In this way, according to the present embodiment, operations, from the user's operating of the eject switch 133 to the ejection of the tray 113, by the EC 25 transmitting the pseudo eject signal to the ODD 100 in order to eject the tray 113 immediately after an electric power is supplied to the ODD 100 in response to the eject signal transmitted through the shared line 101 and the initialization of the ODD 100 is completed, can be completed within about one second. Such reaction of the tray 113 within this period of time cannot be said to bring discomfort to the user in terms of time compared with a case where the electric power is supplied to the ODD 100.

However, for the pseudo eject signal to executed by the OS transmitting a command to the ODD 100 through the line 105, a period of about 10 seconds is required for ejection of the tray 113 to start after the eject switch 133 is pressed, as described later. When an electric power is supplied to the ODD 100 by the EC 25, a BIOS notifies the OS that a change has been made to a device by the plug-and-play function. Upon receipt of the notification, the OS recognizes that any addition or removal has been made to the device and performs enumeration on the ODD 100 to thereby detect whether the ODD has been added or reconnected. Operations so far are performed by a kernel section of the OS, so that they can be completed in a relatively short period of time.

However, after that, the OS notifies various user mode programs of information about the ODD 100. For example, in the Windows (the registered trademark), a drive is recognized by means of a tool called Explorer so that user's processing such as reading files stored in the disc 111 of the ODD 100 is allowed to be received. In the Explorer, a list of HDDs, ODDs and the like connected to the note PC 10 is displayed, and files, folders, and the like are displayed as icons so that they can be created, deleted, moved, and copied. The OS consumes a large amount of time for such operations. Since the OS will not receive the eject command of the ODD 100 through intervention of an API unless contact processing regarding the ODD 100 with respect to the user mode program has been performed, a method of transmitting the eject command to thereby eject the tray 113 is not practical in terms of time.

Figure 5:
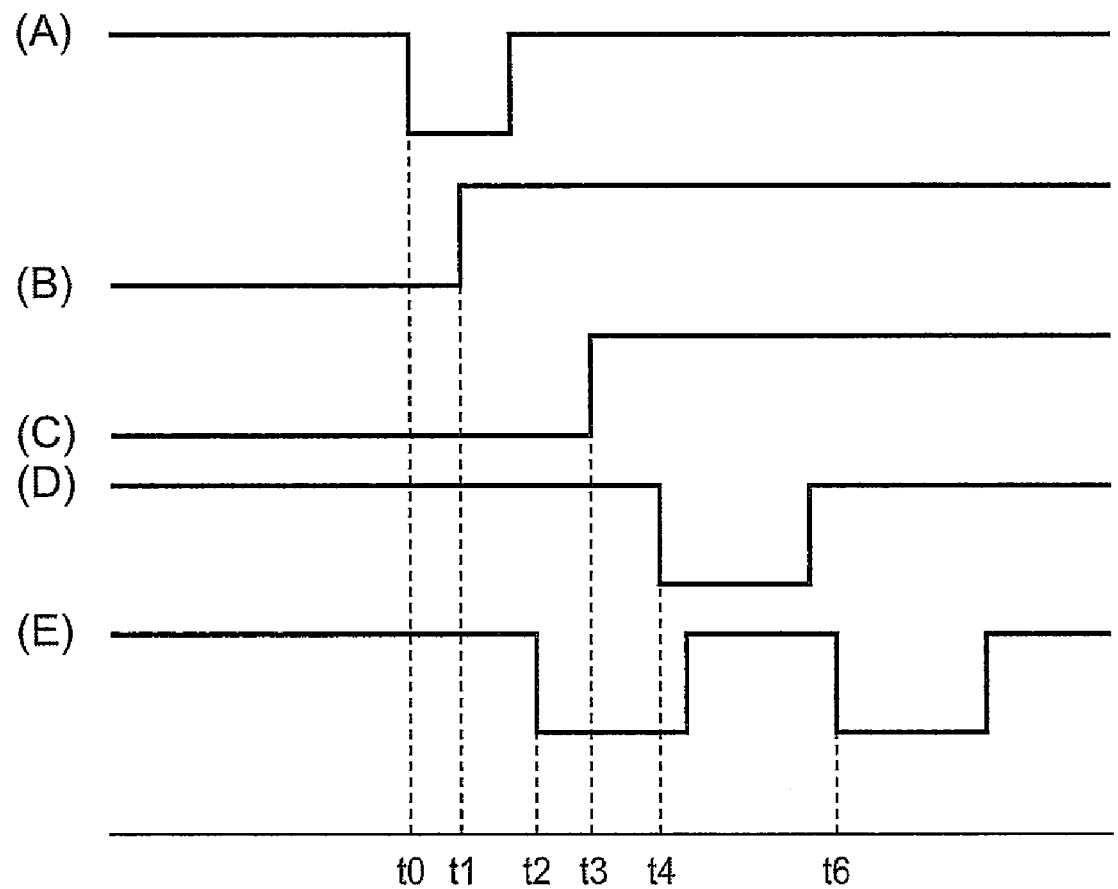
FIG. 5 is a timing diagram for explaining operations until a pseudo eject signal is produced after an eject signal has been produced.

The control of power supply to the ODD 100 and transmission of the pseudo eject signal can be carried out by the south bridge 17 in the same manner in lieu of the EC 25. Moreover, although the ODD 100 has been described as having a serial ATA interface, the present invention can be applied to an optical disc drive having a parallel ATA interface. FIGS. 5A-5E are timing charts for explaining operations until a pseudo eject signal is produced after an eject signal is produced. FIG. 5A illustrates an eject signal, which becomes active in the low state at time t0. FIG. 5B illustrates a power supply state of the ODD 100, in which an electric power is supplied at time t1 in response to the eject signal. FIG. 5C illustrates an initialization state of the ODD 100 to which the electric power is supplied, in which the initialization of the ODD 100 is completed at time t3 to be ready for receiving a command from the system.

FIG. 5D illustrates a pseudo eject signal, which becomes active in the low state at time t4, thus activating the ejection mechanism 119. According to the tray ejecting system illustrated in FIGS. 2 and 3, the period of time from time t0 at which the eject switch is operated to time t4 at which the ejection mechanism 119 is operated can be decreased to within about one second. In order to reduce the period of time, it is necessary to decrease the marginal period of time from time t3 at which the initialization is completed to time t4 at which the pseudo eject signal is transmitted as much as possible.

However, when the marginal period is decreased, there is a possibility that due to some reasons, the initialization completion time is delayed, thus accelerating the time at which the pseudo eject signal becomes active. In such a case, the controller 125 will not receive the pseudo eject signal, so that it become impossible to eject the tray 113. In order to cope with such a problem, a plurality of pseudo eject signals may be transmitted continuously. Referring to FIG. 5E, although a first one-shot pulse signal is transmitted at time t2 earlier than time t3 at which the initialization is completed, since the ejection mechanism 119 can be operated by a second one-shot pulse signal transmitted at time t6 later than time t3, it is possible to properly perform the ejection operation of the tray 113 even when the marginal period is decreased so that the initialization completion time is delayed.

As has been described, the present invention provides a method for achieving power savings on an optical disc drive. Those skilled in the art will appreciate that the present invention can be applied to a slot-loading type drive where a disc is pushed into a drive without intervention of a tray.

While the invention has been particularly shown and described with reference to a preferred embodiment, it will be understood by those skilled in the art that various changes in form and detail may be made therein without departing from the spirit and scope of the invention.

What is claimed is:

1. An optical disc drive comprising:
   a housing;
   a tray configured to accommodate a disc therein;
   an eject switch, mounted on said housing, for generating an eject signal in response to said eject switch being pressed by a user;
   an eject controller for supplying electric power to said optical disc drive in response to said eject signal, and for transmitting a pseudo eject signal, after a predetermined time period has lapsed since the supply of said electric power, via a line through which said eject signal was transferred; and
   a drive controller for ejecting said tray in response to said eject pseudo signal.

2. The optical disc drive of claim 1, wherein said predetermined time period is the time required for the completion of drive initialization after said electric power has been supplied to said optical disc drive.

3. The optical disc drive of claim 1, wherein said pseudo eject signal is a one-shot pulse signal.

4. The optical disc drive of claim 3, wherein said eject controller transmits a plurality of said one-shot pulse signals.

5. The optical disc drive of claim 1, wherein said drive controller instructs a computer to stop supplying said electric power to said optical disc drive when no disc is detected in said tray.

6. The optical disc drive of claim 5, wherein said computer communicates with said optical disc drive via a serial ATA interface.

7. The optical disc drive of claim 6, wherein said eject signal and said pseudo eject signal are transmitted via a line connected to an MD pin of said serial ATA interface.

8. The optical disc drive of claim 1, wherein said eject controller is configured by an embedded controller.

9. The optical disc drive of claim 1, wherein said eject controller is configured by a south bridge.

10. The optical disc drive of claim 1, wherein said optical disc drive includes a spindle motor.

11. A method comprising:
    stopping supply of electric power to an optical disc drive installed within a computer system;
    providing an eject signal in response to an eject switch being pressed by a user, wherein said eject switch is located on a housing of said optical disc drive;
    supplying electric power to said optical disc drive in response to said eject signal;
    transmitting, after a predetermined period of time has lapsed since the supply of said electric power to said optical disc drive, a pseudo eject signal to said optical disc drive via a line through which said eject signal was received; and
    ejecting said tray in response to said pseudo eject signal.

12. The method of claim 11, wherein said stopping further includes determining whether or not a disc is loaded onto said tray.

* * * * *